United States Patent [19]

Hamman

[11] 4,318,573
[45] Mar. 9, 1982

[54] ELECTRIC MOTOR DRIVE UNIT

[75] Inventor: Lyle J. Hamman, Eaton Rapids, Mich.

[73] Assignee: Eaton Stamping Company, Eaton Rapids, Mich.

[21] Appl. No.: 142,896

[22] Filed: Apr. 23, 1980

Related U.S. Application Data

[62] Division of Ser. No. 885,863, Mar. 13, 1978, Pat. No. 4,227,104.

[51] Int. Cl.$^3$ .............................................. F16C 23/04
[52] U.S. Cl. ................................ 308/72; 308/237 R
[58] Field of Search ................ 308/72, 237 R, 238, 308/37; 310/90, 89

[56] References Cited

U.S. PATENT DOCUMENTS

| | | | |
|---|---|---|---|
| 3,302,048 | 1/1967 | Gray | 310/90 |
| 3,319,098 | 5/1967 | Hartman | 310/90 |
| 3,463,951 | 8/1969 | Bauerle et al. | 310/89 |
| 4,053,190 | 10/1977 | McCloskey | 308/72 |
| 4,087,137 | 5/1978 | Voitas | 308/237 R |

*Primary Examiner*—Lenard A. Footland
*Attorney, Agent, or Firm*—Beaman & Beaman

[57] ABSTRACT

An electric motor drive unit for driving a worm wheel such as for vehicle window regulator applications wherein a casing housing a rotatable armature utilizes a synthetic plastic end cap at one end, and a worm wheel housing constitutes the motor end cap at the other end. A worm shaft rotatably mounted within the wheel housing upon its own radial and thrust bearings interconnects to the motor armature through a self-aligning drive element extending through a thrust bearing defined in the worm wheel housing. The brush holders for the motor are homogeneously formed of synthetic plastic material upon the associated end cap, and the armature utilizes an inexpensive self-aligning bearing mounted within the end cap and worm wheel housing.

4 Claims, 9 Drawing Figures

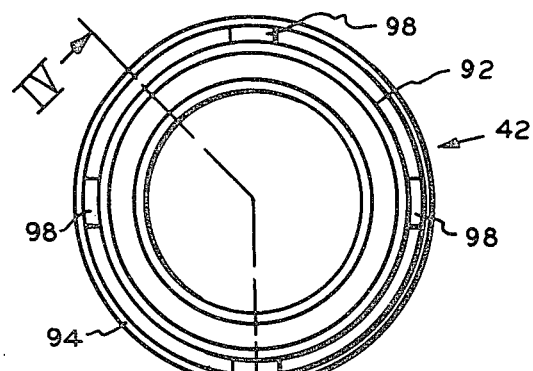
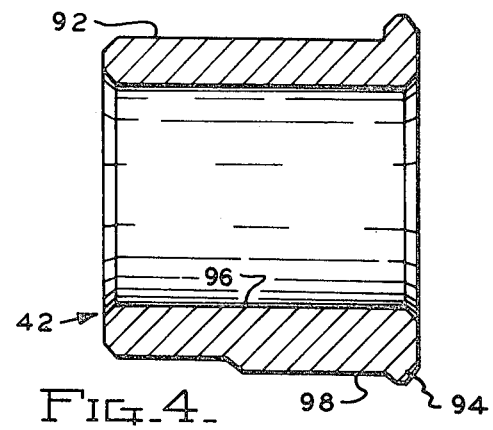
FIG_5. FIG_4.
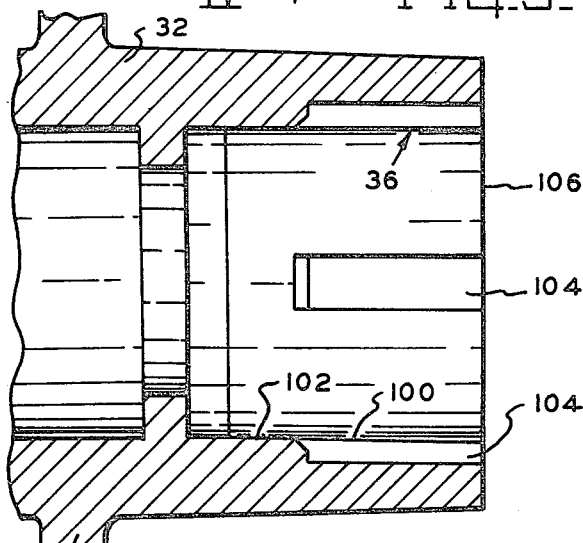
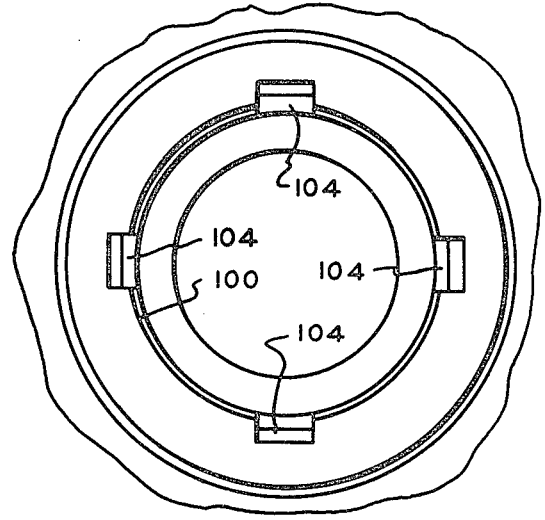
FIG_6. FIG_7.
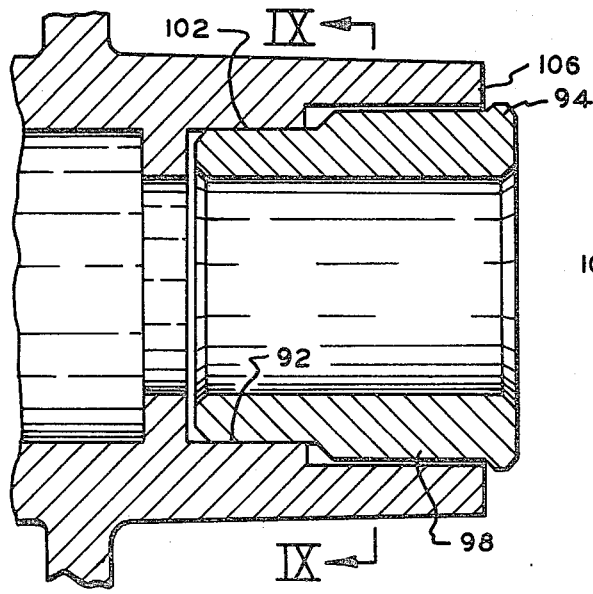
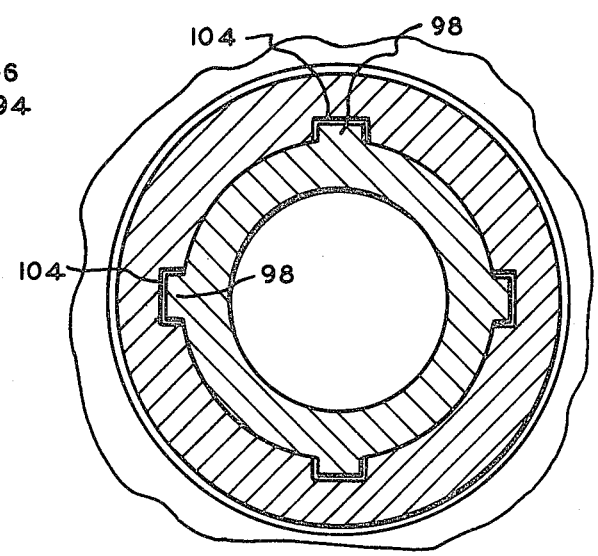
FIG_8. FIG_9.

ELECTRIC MOTOR DRIVE UNIT

This is a division of application Ser. No. 885,863 filed Mar. 13, 1978, U.S. Pat. No. 4,227,104.

BACKGROUND OF THE INVENTION

The invention pertains to electric motor drive units of the type wherein a worm wheel housing constitutes an end cap of an electric motor casing.

The electric motor drive units commonly employed within automobile doors and side panels to electrically operate the window regulators must be of a concise configuration in order to permit installation in limited space. Additionally, such drive units must be capable of producing relatively high torque, yet must be able to withstand reactive forces tending to stall the motor at the end of window travel.

In order to achieve the desired torque requirements worm wheel and worm drives are often employed in electrically powered vehicle window regulator devices. However, difficulties have been encountered in producing such units economically which are capable of long lasting dependable operation. Considerable difficulty has been encountered in maintaining the alignment of the worm and worm wheel wherein the worm constituted an extension of the motor armature shaft, and such arrangements also require expensive machining techniques as well as complicate the assembly of the unit. Further, in installations where a worm shaft and armature must be aligned difficulty is often encountered in maintaining the required alignment tolerances after installation and use.

As vehicle regulator drive units are manufactured in large quantities it is necessary that the cost of manufacture be minimized, and yet the complexity of the device, assembly and alignment problems, and the hard use that window regulators are subjected to, has resulted in a relatively high priced item capable of achieving a broader market if the cost thereof were reduced.

SUMMARY OF THE INVENTION

It is an object of the invention to provide an electric drive unit for rotating a worm wheel suitable for vehicle window regulator operation wherein the assembly consists of a minimum of parts and one end of the motor casing constitutes a worm wheel housing having a worm mounted upon its own shaft utilizing a self-aligning drive with the motor armature.

An additional object of the invention is to provide an electric motor for vehicle window regulator operation which is capable of bind-free operation even under high torque conditions, and wherein inexpensive bearings may be utilized to achieve a long service life.

Another object of the invention is to provide an electric motor drive unit of concise configuration for use with vehicle window regulators wherein a synthetic plastic end cap is utilized having homogeneous brush holders mounted thereon, the brush holder minimizing the necessity for second operations, and yet is of a dialectric construction.

A further object of the invention is to provide an electric motor drive unit of concise configuration and dimension driving a worm wherein the worm is rotatably mounted upon a worm wheel housing on its own radial and thrust bearings in coaxial alignment with an electric motor armature, and self-aligning drive means interconnect the armature and worm.

A further object of the invention is to provide an electric motor drive unit employing inexpensive self-aligning bearings maintained in the end cap and worm wheel housing by the armature, and which are readily assembled within the motor and once assembled, will maintain the desired position.

In the practice of the invention an electric motor armature is mounted within a casing having flattened sides, one end of the casing is enclosed by a synthetic plastic end cap having a self-aligning bearing located therein, and the end cap also includes homogeneously defined brush holders. The other end of the motor casing constitutes a housing for a worm wheel, and this housing includes a bore in which a worm shaft is rotatably mounted in coaxial relationship with the motor armature. The shaft is provided with its own radial and thrust bearings, and is assembled into its bore by means of a threaded thrust plug.

A driving connection between the motor armature and worm shaft is achieved by a self-aligning drive element, and thus, slight misalignment of the worm shaft and armature does not create a binding or frictional resistance to armature rotation.

Alignment of the armature upon the end cap and gear wheel housing is also augmented by the use of self-aligning bearings supporting the armature which are held in place by the armature itself, and such self-aligning bearings utilize a construction permitting an axial portion of the bearing to be press fitted within its bore, while the remaining axial portions are capable of slight radial deviation for self-aligning purposes, and, yet a keying system prevents rotation of the bearing relative to its support socket.

BRIEF DESCRIPTION OF THE DRAWINGS

The aforementioned objects and advantages of the invention will be appreciated from the following description and accompanying drawings wherein:

FIG. 4 is a diametrical sectional, enlarged view of the armature self-aligning bearing as taken along Section IV—IV of FIG. 5, FIG. 5 is an end view of the self-aligning bearing as taken from the left of FIG. 4, FIG. 6 is a diametrical elevational view of the self-aligning bearing bore or socket prior to receiving the bearing, FIG. 7 is a view of the bearing socket as taken from the right of FIG. 6, FIG. 8 is a view similar to FIG. 6 illustrating the self-aligning bearing assembled within its socket, and FIG. 9 is a sectional elevational view of FIG. 8 as taken along Section IX—IX thereof.

DESCRIPTION OF THE PREFERRED EMBODIMENT

Figures 1, 2, 3:
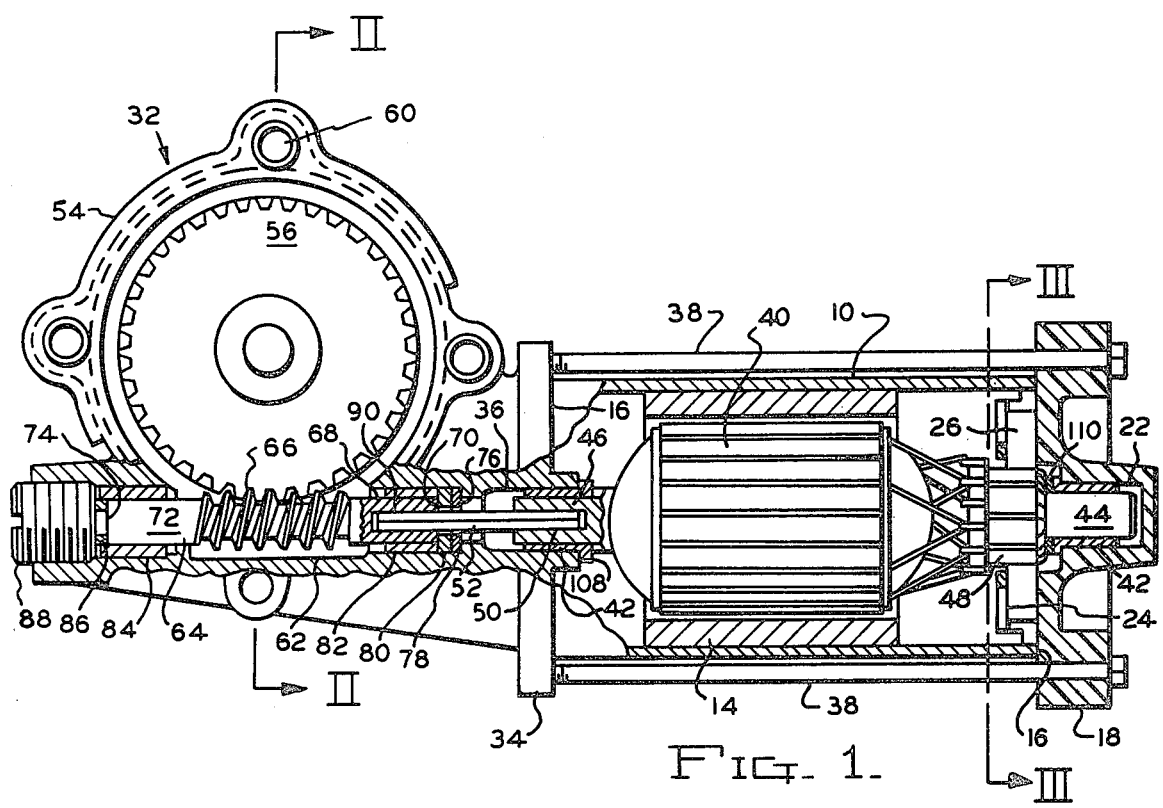
FIG. 1 is an elevational view, partially in section, illustrating the motor drive unit of the invention.
FIG. 2 is an elevational sectional view taken through the diameter of the worm wheel along Section II—II of FIG. 1.
FIG. 3 is an elevational sectional view taken through the motor along Section III—III of FIG. 1.

The overall relationship of the components of the invention will be appreciated from FIG. 1. The electric drive unit in accord with the invention includes a motor casing 10 preferably formed of sheet metal in accord with the disclosure of my co-pending U.S. application Ser. No. 836,354, and such casing includes flattened sides 12 as will be appreciated from FIG. 3. Internally, the casing is provided with field coil 14, and the ends 16 of the casing lie in planes perpendicularly disposed to the casing axis.

As viewed in FIG. 1, the right end of the casing 10 is enclosed by a molded synthetic plastic end cap 18. The end cap includes casing positioning ribs 20, FIG. 3, which engage the inside of the casing locating the end cap thereon. Also, the end cap 18 includes a bearing socket 22 constructed in a manner later described, and the bearing socket is of sufficient axial dimension to receive an armature journal. Further, the end cap includes a pair of diametrically related brush guides 24 which are homogeneously formed of the synthetic plastic material of the end cap, and preferably, the brush guides 24 are of the configuration shown in my corresponding application Ser. No. 836,354. The brush guides includes brushes 26 radially slidable therein and biased inwardly by torsion springs 28 supported upon spring anchors 30 also homogeneously molded of the material of the end cap.

The other end of the motor casing 10 is enclosed by a worm wheel housing generally indicated at 32. The housing 32 includes a flange 34 adapted to abut the casing end, and casing positioning ribs similar to those of the end cap 18 represented at 20, are utilized to position the worm gear housing upon the casing end. The housing 32 includes a bearing socket 36 of significant axial dimension for receiving the other armature journal.

The end cap 18 and the worm wheel housing 32 are maintained upon the ends of the casing 10 by a plurality of tie rods 38 extending through openings defined in the end cap and housing. In the usual manner, the tie rods 38 are provided with threaded ends and heads whereby tension of the rods will firmly maintain the end cap and the housing upon the casing providing a high strength assembly of these components.

The motor armature 40 is supported upon identical self-aligning bearings 42 mounted within the end cap and the worm wheel housing. The armature journal 44 is received within the socket 22, while the journal 46 is received within housing socket 36 and the armature commutator 48 is engaged by the brushes 26.

The armature journal 46 is provided with an axial bore 50 of a non-circular cross section, such as rectangular or square, in which a self-aligning drive element 52 later described, is received.

The worm wheel housing 32 is cast of metal and includes a generally circular portion 54 in which the worm wheel 56 is rotatably mounted upon a shaft 58, FIGS. 1 and 2. The portion 54 includes mounting holes 60 whereby the motor unit may be mounted in the desired location within the vehicle door or side panel.

The housing 32 also includes a bore generally indicated at 62 having an axis coaxial with the axis of armature 40. The bore 62 rotatably receives the worm shaft 64, and as will be appreciated from FIG. 1, the worm shaft includes a central region upon which the worm threads 66 are formed, an inner cylindrical region 68 terminating in an end 70, and an outer cylindrical region 72 terminating in an end 74. The inner end of the bore 62 is provided with a shoulder 76 against which rests an annular washer 78, and an annular thrust bearing 80 bears against the washer 78 and the shaft end 70. A radial sleeve bearing 82 is located within the bore 62 and circumscribes the worm shaft end 68 for radial support thereof.

At the outer end of the shaft 64 an annular sleeve bearing 84 circumscribes the shaft region 72, and an annular thrust bearing 86 abuts against the shaft end 74. Axial positioning of the shaft 64 is provided by a threaded thrust plug 88 mating with threads defined in the bore, and upon suitable adjustment of the plug axial "play" or movement of the shaft may be very accurately restrained without binding the shaft.

An axial bore 90 is defined in the worm shaft end 70 of non-circular transverse cross section for receiving the self-aligning drive element 52 which is of a non-circular configuration corresponding to the configuration of the bores 50 and 90. For instance, the bores 50 and 90 may be of a square cross section, and the element 52 will also be square and may be formed as tightly wound wires such as form a speedometer cable whereby limited lateral flexing is possible, yet the element is capable of effectively transmitting significant torque forces. Also, it within the scope of the invention that the element 52 constitute a square key, or the like, of only slightly less transverse dimension than the bores 50 and 90 whereby the tolerance between the key and bores will permit effective driving of the worm shaft by the armature even though a slight misalignment may occur.

The construction of the self-aligning bearing 42 utilized with the armature is best appreciated from FIGS. 4-9, and as the bearings used with each armature journal are identical only a single description is necessary.

The configuration of the bearing will be appreciated from FIGS. 4 and 5 wherein the bearing is of a generally annular cylindrical form having a cylindrical surface 92 intersecting a radially extending flange 94. The bearing is inwardly provided with a cylindrical bore 96 of a dimension to rotatably support the associated armature journal.

Four radially extending lugs or keys 98 of rectangular configuration extend from the surface 92, as will be appreciated from FIG. 5. The keys 98 axially extend from the flange 94 through more than one half the axial length of the surface 92, and are disposed at 90° intervals circumferentially about the surface 92. Preferably, the bearings are formed of an oil impregnated sintered bearing metal.

The bearing sockets 22 and 36 are identical and for purpose of illustration socket 36 is shown in FIGS. 6-9 prior to assembly of the armature. The sockets are of a substantially cylindrical form, but slightly vary from a cylindrical configuration in that the surface 100 has a 1° taper throughout its length converging to the left as viewed in FIG. 6 and the diameter of the socket portion 102 is approximately 0.002 inches less than the diameter of the bearing surface 92 adjacent the left end, FIG. 4, whereby insertion of the bearing into the socket 36 produces a press fit at the surface 102. The socket 36 is provided with four rectangular key slots 104, FIG. 7, located at 90° intervals about the socket, and the key slots are of sufficient axial dimension to receive the bearing keys 98 in a slightly loose manner.

The bearing 42 is inserted into the socket 36 as shown in FIG. 8 wherein the inner end of the bearing surface 92 will be press fitted into the socket position 102, and the flange 94 disposed adjacent the end 106 of the socket. Of course, upon inserting the bearing into its socket the bearing keys 98 are aligned with the key slots 104 for reception therein as will be appreciated from FIG. 9.

The cylindrical journals 44 and 46 of the armature 40 are received within the bearing bores 96, and if a mislaignment exists between the axes of the bearings on opposite ends of the armature the fact that the bearings are only firmly radially supported at the socket portion 102, and the fact that the socket surface 100 has a 1° taper, will permit the bearings 42 to slightly "tilt" in their associated socket to accurately align the axis of the bearings with the axis of the armature. This "tilting" of the bearings in no way affects the radial support of the armature as the press fit of the bearings within their associated sockets prevents relative radial movement of the bearing and socket, and the bearings will not rotate relative to their associated socket because of the reception of the bearing keys 98 into the key slots 104.

As will be appreciated from FIG. 1, the armature is provided with an abutment surface 108, which engages the flange 94 of the left bearing 42, FIG. 1, while a washer 110 is mounted upon the armature journal 44 adjacent the commutator 48 for engaging the bearing flange 94 of the right bearing. Thus, the armature itself prevents axial movement of the bearings from their associated socket, and in this manner an economical selfaligning bearing support for the armature is achieved without the usual requirement of spherical surfaces of the like conventionally employed with self-aligning bearing constructions.

Accordingly, it will be appreciated that the armature support upon its self-aligning bearings will prevent binding of the armature even though slight misalignment may occur when the end cap 18 and worm wheel housing 32 are mounted upon the casing 10. Likewise, the fact that the worm shaft 64 is supported upon its own radial and thrust bearings, and is connected to the armature 40 by a self-aligning drive element 52, prevents any binding from occuring in the worm shaft upon assembly of the worm wheel housing 32 and motor casing 10. These two features assure a free running motor drive unit in which internal frictional forces arising from misalignment are avoided, and these features plus those previously described result in a relatively low cost dependable electric motor drive unit for a worm wheel of concise configuration capable of producing relatively high torque.

It is appreciated that various modifications to the inventive concepts may be apparent to those skilled in the art without departing from the spirit and scope of the invention.

I claim:

1. A self-aligning bearing adapted to be partially press fitted into a socket comprising an annular body having a cylindrical outer surface, a cylindrical bore, a first end and adjacent first axial end region, and a second end and adjacent second axial end region, a plurality of radially extending keys projecting from said outer surface along said second axial end region each extending the axial length of said second end region, and a radial flange defined on said second end projecting outwardly beyond said outer surface.

2. In a self-aligning bearing as in claim 1 wherein four keys are defined on said second axial end region, said keys being circumferentially spaced at 90° intervals.

3. A self-aligning bearing assembly comprising, in combination, a member having a socket defined thereon, said socket having a surface including an inner axial portion and an outer axial portion, said socket surface being slightly conical diverging in the direction of said outer axial portion, an axial extending key slot defined in said outer axial portion, a tubular sleeve bearing having an outer cylindrical surface of a diameter to produce a press fit when inserted into said socket inner portion and an outer axial portion, an axially extending radially projecting key defined on said bearing outer axial portion, said key being received within said socket key slot upon said bearing being press fitted into said socket inner portion.

4. In a self-aligning bearing assembly as in claim 3 wherein four slots are defined in said socket outer axial portion circumferentially spaced at 90° intervals about the circumference of said socket outer axial portion, and four keys are defined on said bearing outer axial portion circumferentially spaced at 90° intervals about the circumference of said bearing outer axial portion.

* * * * *